(12) United States Patent
Bhetanabhotla et al.

(10) Patent No.: US 9,559,919 B2
(45) Date of Patent: Jan. 31, 2017

(54) DISPLAY OF PORT TRANSMIT AND RECEIVE PARAMETERS SORTED BY HIGHER OF TRANSMIT OR RECEIVE VALUE

(71) Applicant: Brocade Communications Systems, Inc., San Jose, CA (US)

(72) Inventors: Murthy N. Bhetanabhotla, Sunnyvale, CA (US); Sathiapriya Sathiyagiri, Sunnyvale, CA (US); Ning Zhou, San Jose, CA (US); David B. Hamilton, Milpitas, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 483 days.

(21) Appl. No.: 13/789,475

(22) Filed: Mar. 7, 2013

(65) Prior Publication Data
US 2014/0258289 A1  Sep. 11, 2014

(51) Int. Cl.
*G06F 17/30* (2006.01)
*H04L 12/26* (2006.01)

(52) U.S. Cl.
CPC ......... *H04L 43/045* (2013.01); *H04L 43/0888* (2013.01)

(58) Field of Classification Search
CPC .... H04L 41/22; H04L 43/045; H04L 43/0876; H04L 47/11
USPC ....................................................... 707/736
See application file for complete search history.

(56) References Cited

U.S. PATENT DOCUMENTS

| | | | | |
|---|---|---|---|---|
| 6,147,991 | A * | 11/2000 | Rogers | 370/389 |
| 6,389,480 | B1 * | 5/2002 | Kotzur et al. | 709/249 |
| 7,649,834 | B2 * | 1/2010 | Badat | H04L 41/12 370/216 |
| 8,059,640 | B2 * | 11/2011 | Obara | H04L 49/1515 370/388 |
| 8,248,928 | B1 * | 8/2012 | Wang | H04L 43/026 370/230 |
| 8,769,148 | B1 * | 7/2014 | Singh | H04L 45/7453 709/242 |
| 2005/0060574 | A1 * | 3/2005 | Klotz | H04L 41/22 726/4 |
| 2006/0056411 | A1 * | 3/2006 | Badat | H04L 41/12 370/392 |
| 2006/0060598 | A1 * | 3/2006 | Bando | B65D 83/0805 221/46 |
| 2008/0091864 | A1 * | 4/2008 | Otsuka | 710/200 |
| 2008/0281843 | A1 * | 11/2008 | Furusho | G06F 9/52 |
| 2009/0067436 | A1 * | 3/2009 | Gast | H04L 12/4679 370/395.53 |
| 2009/0245128 | A1 * | 10/2009 | Matityahu et al. | 370/252 |
| 2010/0098070 | A1 * | 4/2010 | Obara | H04L 49/1515 370/388 |

(Continued)

*Primary Examiner* — Debbie Le
(74) *Attorney, Agent, or Firm* — Blank Rome, LLP

(57) ABSTRACT

The data ports in a network are displayed in a list in descending order based on either the higher transmit or receive data value of the port. Therefore, the port with the highest of either the transmit or receive data value would be displayed on the top of the list. The port with the second highest of the transmit or receive data value would be displayed second on the list. This process would continue for all data ports that are displayed. The other of the transmit or receive data values of the port would be displayed but would not affect the ordering on the display.

6 Claims, 9 Drawing Sheets

(56) References Cited

U.S. PATENT DOCUMENTS

| | | | | |
|---|---|---|---|---|
| 2011/0044190 A1* | 2/2011 | Mitsumori | ............ | H04L 43/026 370/252 |
| 2012/0209941 A1* | 8/2012 | Yamamoto | .............. | H04L 41/14 709/212 |
| 2013/0055257 A1* | 2/2013 | Yamashita | ............ | G06F 9/5077 718/1 |
| 2013/0191437 A1* | 7/2013 | Itoh | ................... | G06F 15/17375 709/201 |

* cited by examiner

DISPLAY OF PORT TRANSMIT AND RECEIVE PARAMETERS SORTED BY HIGHER OF TRANSMIT OR RECEIVE VALUE

BACKGROUND OF THE INVENTION

1. Field of the Invention

The invention relates to network device management and more particularly to displaying a networking device.

2. Description of the Related Art

Network management software provides network administrators a way of tracking the bandwidth utilization of ports on a network. For smaller networks with a fewer number of ports, closely monitoring port utilization in a graphical user interface (GUI) is a less arduous task. However, for large networks, there are often so many ports that arrangement of the display of data values for each port based on predetermined parameters is necessitated. Current solutions to this problem offer arranging the ports in several ways. One current solution offers arranging the ports in descending order based on the port with the highest transmit value. Another current solution offers arranging the ports in descending order based on the port with the highest receive value. Yet another current solution offers arranging the ports in descending order based on the port with the highest of sum data transmit and data receive value. While these solutions aid administrators in tracking port traffic, they do not always allow for quick viewing of ports close to their physical maximum data transmit or receive values so that the administrator can take action to reroute traffic before congestion occurs. Therefore a method and system to improve the display of heavily used ports is desirable.

SUMMARY OF THE INVENTION

The data ports in a network are displayed in a list in descending order based on either the higher transmit or receive data value of the port. Therefore, the port with the highest of either the transmit or receive data value would be displayed on the top of the list. The port with the second highest of the transmit or receive data value would be displayed second on the list. This process would continue for all data ports that are displayed. The other of the transmit or receive data values of the port would be displayed but would not affect the ordering on the display.

This technique can be used on any telecommunication network.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Figure 1:
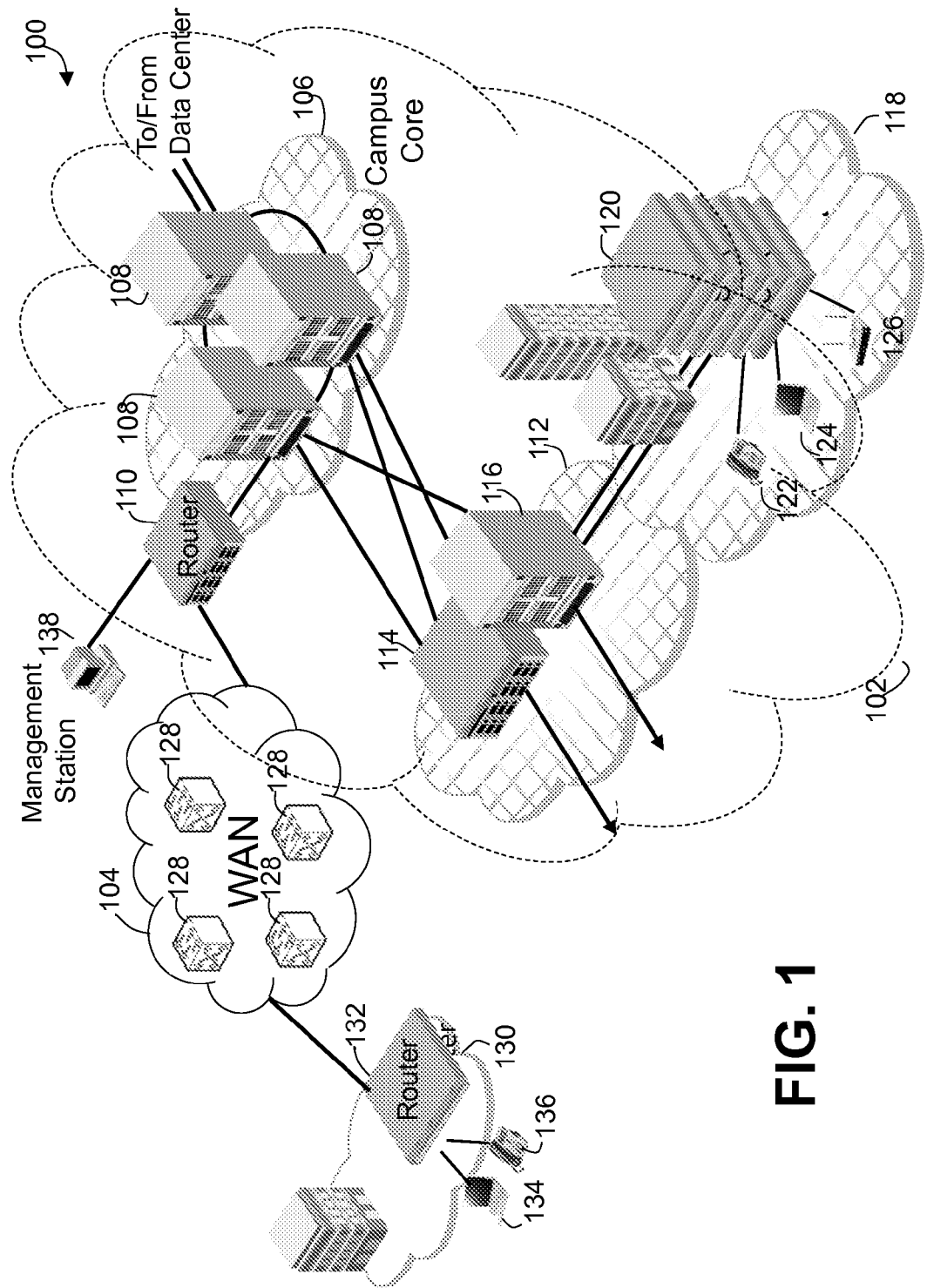
FIG. 1 is a diagram illustrating a local area network (LAN) and wide area network (WAN) as may be incorporated together with the present invention.

Referring to FIG. 1, an Ethernet network 100 is shown wherein a LAN 102 is interconnected to a remote campus 130 via WAN 104. The campus core 106 includes a plurality of interconnected core switches 108. The core switches 108 are connected to a data center (not shown). A router no is connected to the core switches and the WAN 104. The core switches 108 are connected to switches 114 and 116 of an aggregation campus 112. The aggregation campus switches 114 and 116 are connected to switches 120 of large network 118 and provide data communication services to the large network's telephone 122, computer 124, and wireless access 126 devices. The aggregation network switches 114 and 116 may also be connected to additional campuses (not shown) in order to provide additional data communication services. The LAN 102 is connected to the WAN 104 via router no. The WAN 104 is comprised of a plurality of interconnected Ethernet switches 128 and other networking devices (not shown). WAN 104 is connected to remote campus 130 via a router 132. Router 132 provides data communication services to computers 134 and telephone devices 136. It is understood that this is an exemplary network and numerous other network topologies can be monitored according to the present invention.

In an embodiment of the present invention a management station 138 is connected to router no of the campus core 106. As will be appreciated by one having ordinary skill in the art, the management station 138 allows a network administrator to monitor the data traffic, port utilization, and various other networking characteristics of each switching device in the Ethernet network 100.

Figure 2:
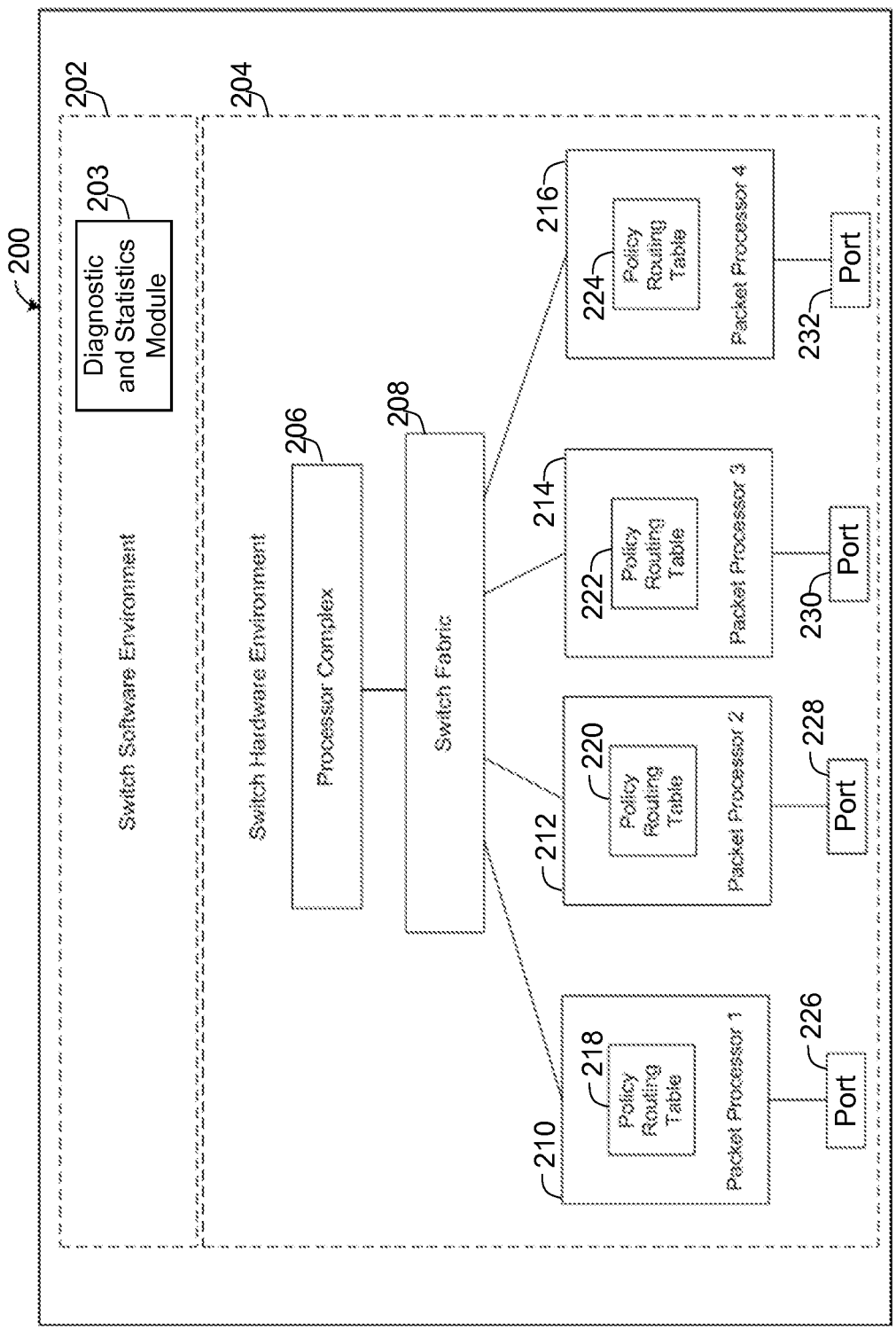
FIGS. 2 is a diagram of an Ethernet Switch that may be incorporated together with the present invention.

Turning next to FIG. 2, a block diagram of an Ethernet switch or router 200 that may be utilized in Ethernet network 100 is shown. The Ethernet switch 200 comprises a switch software environment 202 and switch hardware environment 204. The software environment 202 includes a diagnostics and statistics module 203 to allow management software access to the various statistical counters in the switch 200, such as receive and transmit rate counters for each port 226, 228, 230, 232. The switch hardware environment 204 has a processor complex 206 that consists of processors as defined. The processor complex 206 is connected to a switch fabric 208, which provides the basic switching operations for the switch 200. The switch fabric 208 is connected to a plurality of packet processors 210, 212, 214, 216. Each packet processor 210, 212, 214, 216 has its own respective policy routing table 218, 220, 22, 224 to provide conventional packet analysis and routing. Each packet processor 210, 212, 214, 216 is connected to its own respective port or ports 226, 228, 230, 232. When the Ethernet switch 200 is implemented in a network such as network 100, the data value of each port 226, 228, 230, and 230 may be monitored and analyzed using management software on a management station, such as management station 136. Again, it is understood that this is an exemplary Ethernet switch architecture and numerous other architectures can be used according to the present invention.

Figure 3:
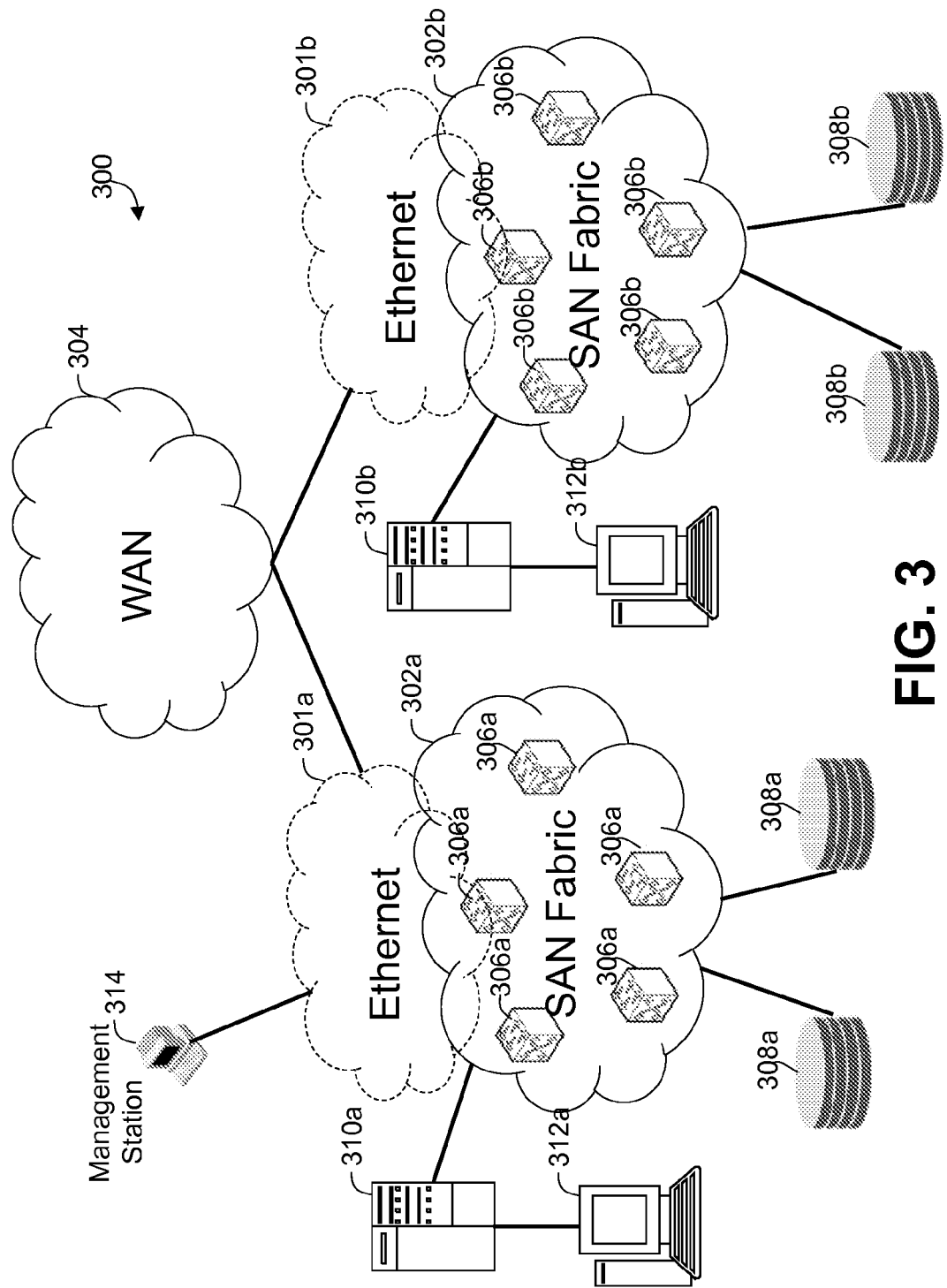
FIG. 3 is a diagram illustrating Fibre Channel (FC) storage area network (SAN) fabrics interconnected via a wide area network (WAN) as may be incorporated together with the present invention.

FIG. 3 illustrates a SAN network 300 utilizing the Fibre Channel (FC) protocol. As shown, a plurality of FC SAN fabrics 302a and 302b are interconnected via WAN 304. The SAN fabrics 302a and 302b are comprised of a plurality of FC switches 306a and 306b, respectively. SAN fabric 302a is connected to a plurality of storage devices 308a. Likewise, SAN fabric 302b is connected to a plurality of storage devices 308b. Each SAN fabric 302a and 302b connect their respective storage devices 308a and 308b to application servers 310a and 310b, which are in turn connected to computers 312a and 312b. This configuration allows for computer 312a to access storage devices 308b and for computer 312b to access storage devices 308a. As above, this is an exemplary FC SAN architecture and numerous other FC architectures can be managed according to the present invention.

In an embodiment of the present invention a management station 314 is connected to Ethernet LAN 301a, which is connected directly to SAN network 302a and indirectly to Ethernet LAN 301b via WAN 304. Ethernet LANs 301a and 301b are connected to the Ethernet management ports of the switches 306a and 306b to provide a management network for the switches 306a and 306b. As will be appreciated by one having ordinary skill in the art, the management station 314 allows a network administrator to monitor the data traffic, port utilization, and various other networking characteristics using network management software, such that any data congestion may be alleviated.

Figure 4:
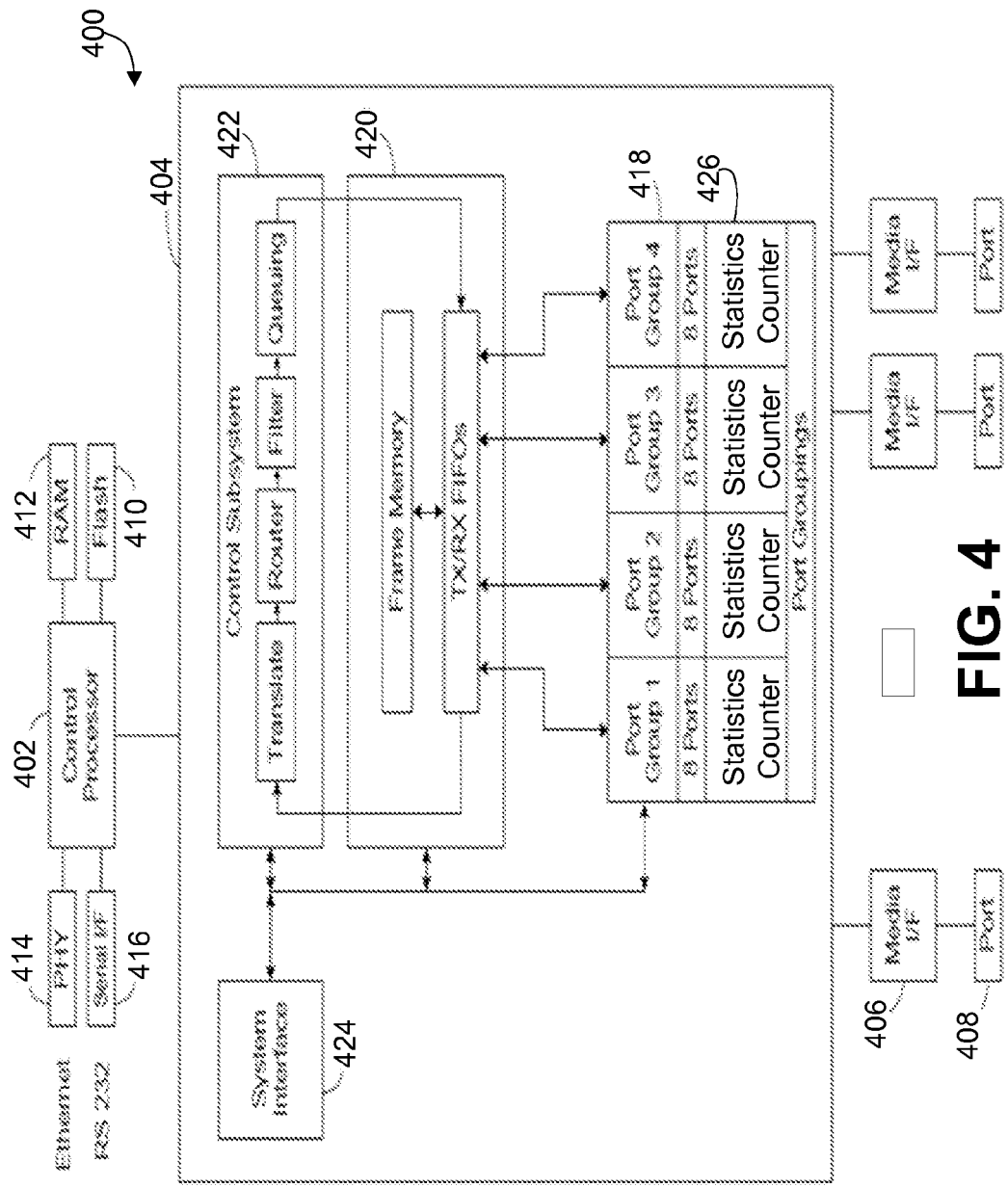
FIG. 4 is a diagram of a Fibre Channel Switch that may be incorporated together with the present invention.

FIG. 4 illustrates a block diagram of a FC switch 400 that may be utilized in accordance with the SAN network 300. A control processor 402 is connected to a switch ASIC 404. The switch ASIC 404 is connected to media interfaces 406 which are connected to ports 408. Generally the control processor 402 configures the switch ASIC 404 and handles higher level switch operations, such as the name server, the redirection requests, and the like. The switch ASIC 404 handles the general high speed inline or in-band operations, such as switching, routing and frame translation. The control processor 402 is connected to flash memory 410 to hold the software, to RAM 412 for working memory and to an Ethernet PHY 414 used for management connection and serial interface 416 for out-of-band management.

The switch ASIC 402 has four basic modules, port groups 418, a frame data storage system 420, a control subsystem 422 and a system interface 424. The port groups 418 perform the lowest level of packet transmission and reception, and include a statistical counter module 426 to allow management software to access the various statistical counters of the switch 400, such as receive and transmit rate counters for each port. Generally, frames are received from a media interface 406 and provided to the frame data storage system 420. Further, frames are received from the frame data storage system 420 and provided to the media interface 406 for transmission out a port 408.

Figure 5:
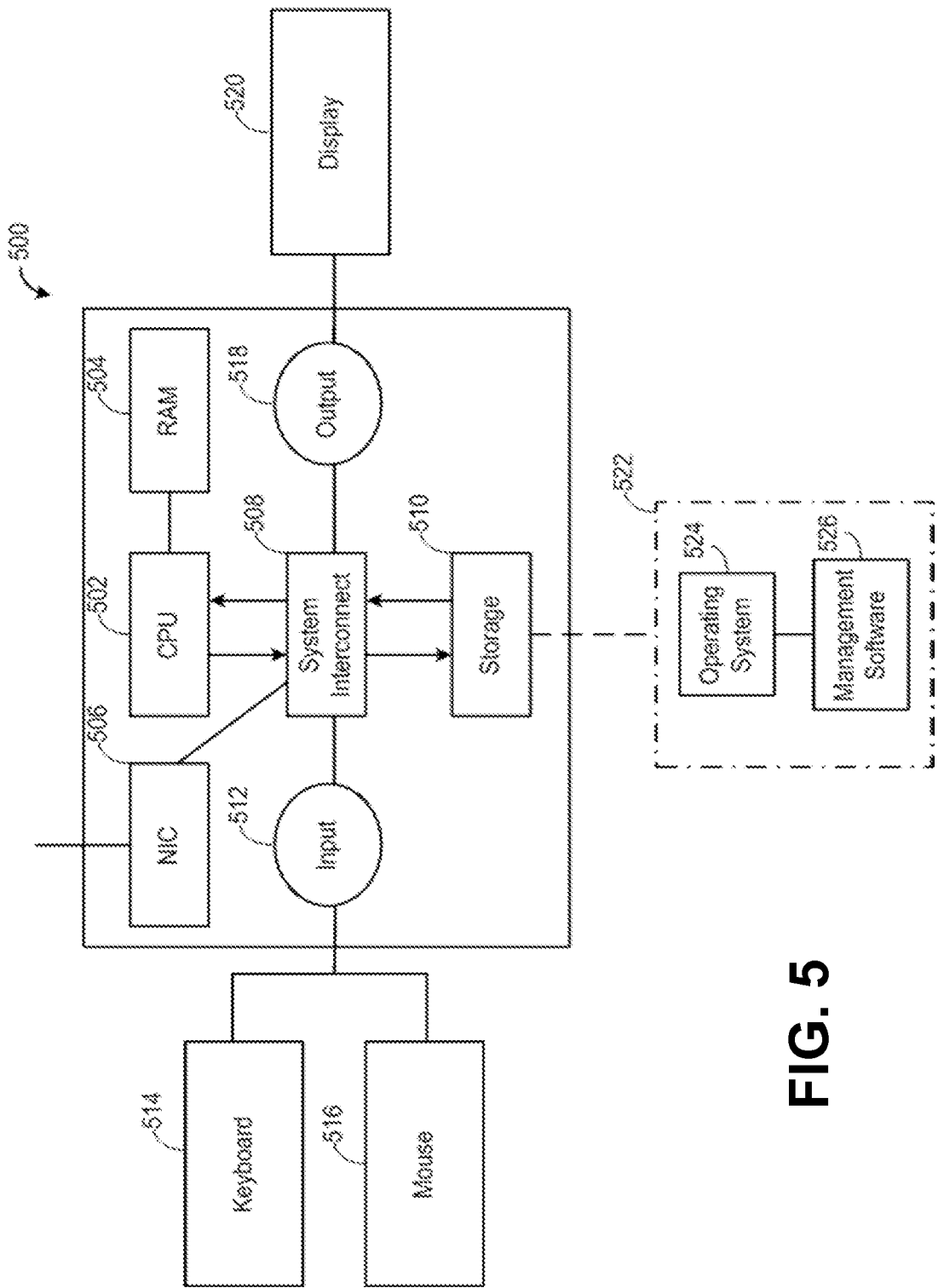
FIG. 5 is a block diagram of a management station connected to a communications network for operating in accordance with the present invention.

FIG. 5 illustrates a block diagram of a management station 500, similar to management stations 138 and 314, that may be utilized in accordance with the present invention. As shown, the management station 500 is comprised of a central processing unit (CPU) 502, random access memory (RAM) 504, network interface card (NIC) 506, system interconnect 508, storage component 510, input component 512, and output component 518 which are all interconnected via the system interconnect 508. The input component 512 may be connected to an input device such as a keyboard 514 and mouse 516. The output component 518 is connected to a display device 520, such as an LCD monitor. Storage component 510 stores software 522, which typically includes an operating system 524 and network management software 526. The NIC 506 allows the management station 500 to communicate with a network. As understood by those skilled in the art, network management software is typically designed to allow a network administrator to quickly and efficiently monitor and manage a large network via a user interface, often a graphical user interface (GUI). The network management software 526 could be, for example, Brocade Network Advisor by Brocade Communication Systems, Inc. Once booted, the management station 500 loads the operating system 524 from the storage 510 into the RAM 504. From the operating system 524 a user may run the network management software 526, which is then also loaded into the RAM 504. The interface of the network management software 526 is then displayed on the display 520 via the output component 518. The network management software 526 allows a user to monitor numerous network characteristics, such as the number events on the network, number of unused ports of network devices, memory utilization of network devices, bandwidth utilization of network devices, and CPU utilization of network devices. It is understood that this is an exemplary computer system architecture and numerous other computer architectures can be used according to the present invention.

Figure 6:
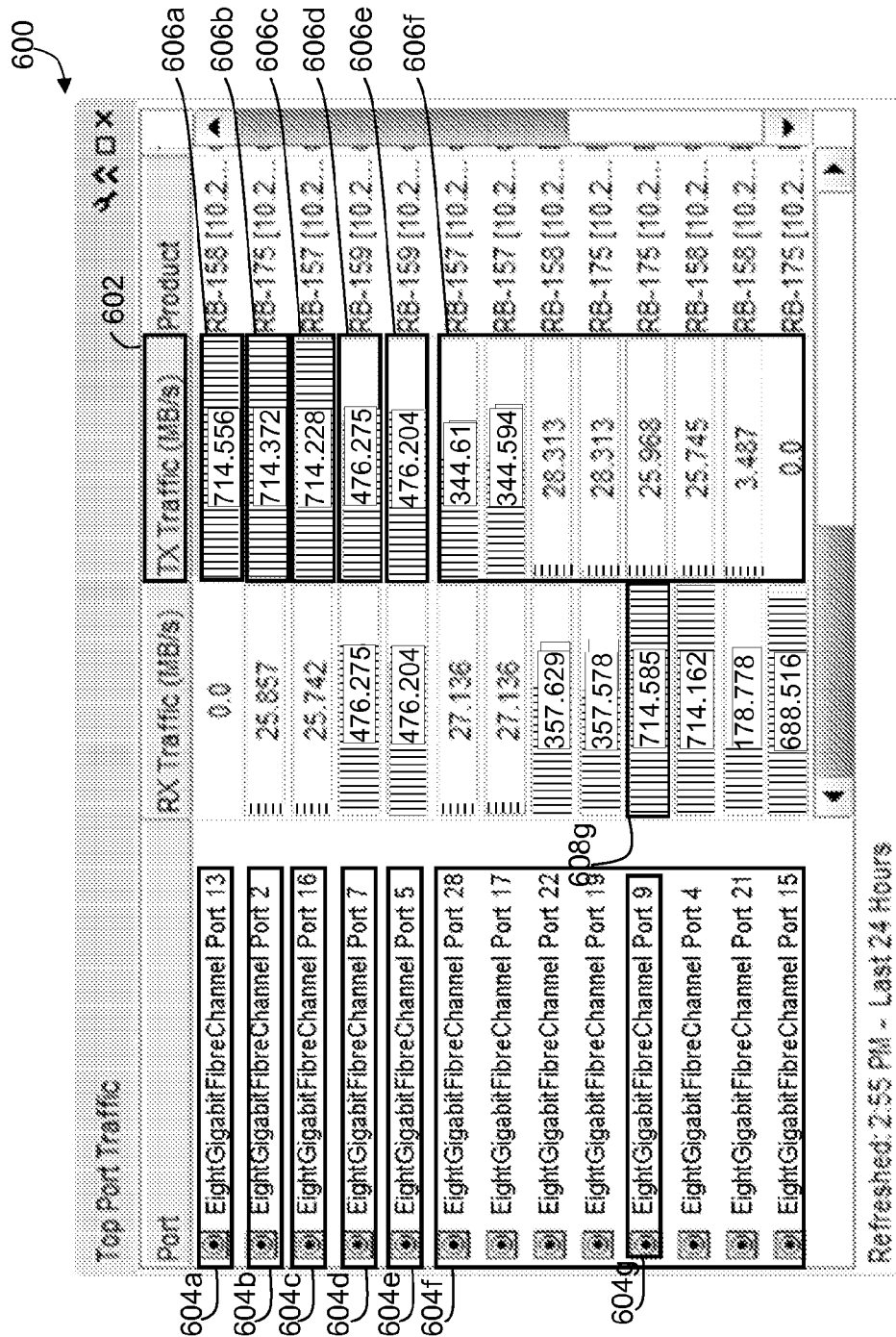
FIG. 6 is a screenshot of an example GUI according to prior art where a list of data ports is sorted in descending order based on the port with the highest data transmit value.

FIG. 6 illustrates an example of the graphic user interface (GUI) boo of management software 526 wherein a plurality of ports 604 are sorted in accordance with one version of the prior art. As understood by those having skill in the art, network management software accumulates the particular characteristics of a network by either: (1) polling switches via application programming interface (API), command line interface (CLI) or simple network management protocol (SNMP); or (2) receiving warnings from switches on the network via API or SNMP. The network management software then displays the particular characteristics being tracked in a window, such as a widget, for the network administrator. As shown, the plurality of ports 604 are sorted in descending order based on the port having the highest transmit value 602 of the plurality of ports 604. Consequently, the first port 604a in the arrangement has the highest data transmit value 606a, the second port 604b in the arrangement has the second highest data transmit value 606b, the third port 604c in the arrangement has the third highest data transmit value 606c, the fourth port 604d has the fourth highest data transmit value 606d, and the fifth port 604e has the fifth highest data transmit value 606e. The remaining ports 604f are sorted based on their transmit values 606f in the same manner as ports 604a through 604e. The problem with this arrangement is that it may display ports with heavy data receive values closer to the bottom of the sorted list. For example, port 604g has a receive rate 608g higher than any of the receive rates illustrated, so that port should be as much of a concern as port 606a, yet it is displayed far down on the list due to its low transmit rate.

Figure 7:
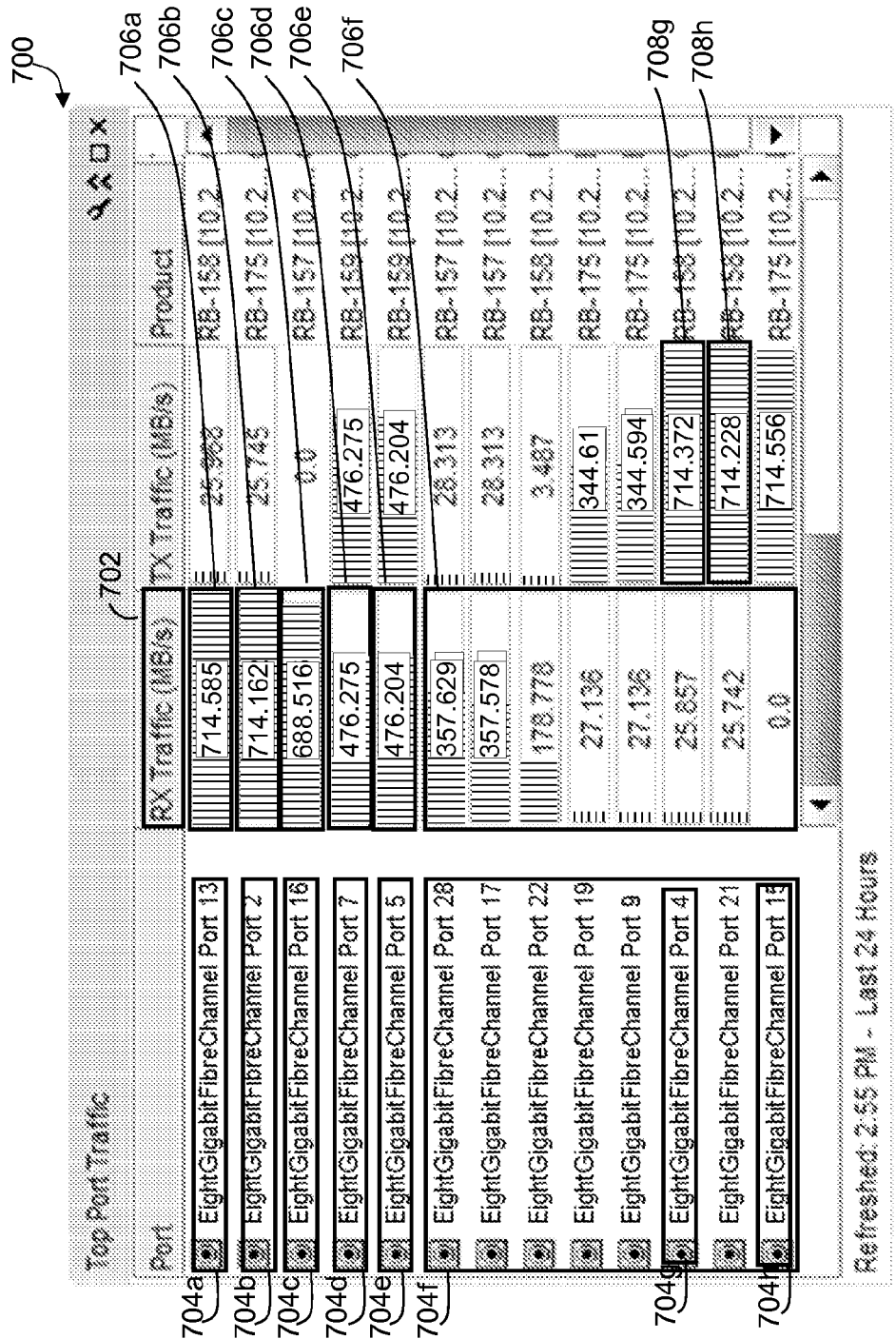
FIG. 7 is a screenshot of an example GUI according to prior art where a list of data ports is sorted in descending order based on the port with the highest data receive value.

FIG. 7 illustrates an example of the GUI 700 of management software 526 wherein a plurality of ports 704 are sorted in accordance with one version of the prior art. As shown, the plurality of ports 704 are sorted in descending based on the port having the highest data receive value 702 of the plurality of ports 704. Consequently, the first port 704a in the arrangement has the highest data receive value 706a, the second port 704b in the arrangement has the second highest data receive value 706b, the third port 704c in the arrangement has the third highest data receive value 706c, the fourth port 704d has the fourth highest data receive value 706d, and the fifth port 704e has the fifth highest data receive value 706e. The remaining ports 704f are arranged in the same manner as ports 704a through 704e. The problem with this arrangement is that it may display ports with heavy data transmit values closer to the bottom of the sorted list. This is shown for ports 704g and 704h where the transmit rates 708g, 708h are effectively the same as the receive rates 706a and 706b of ports 704a and 704b.

Figure 8:
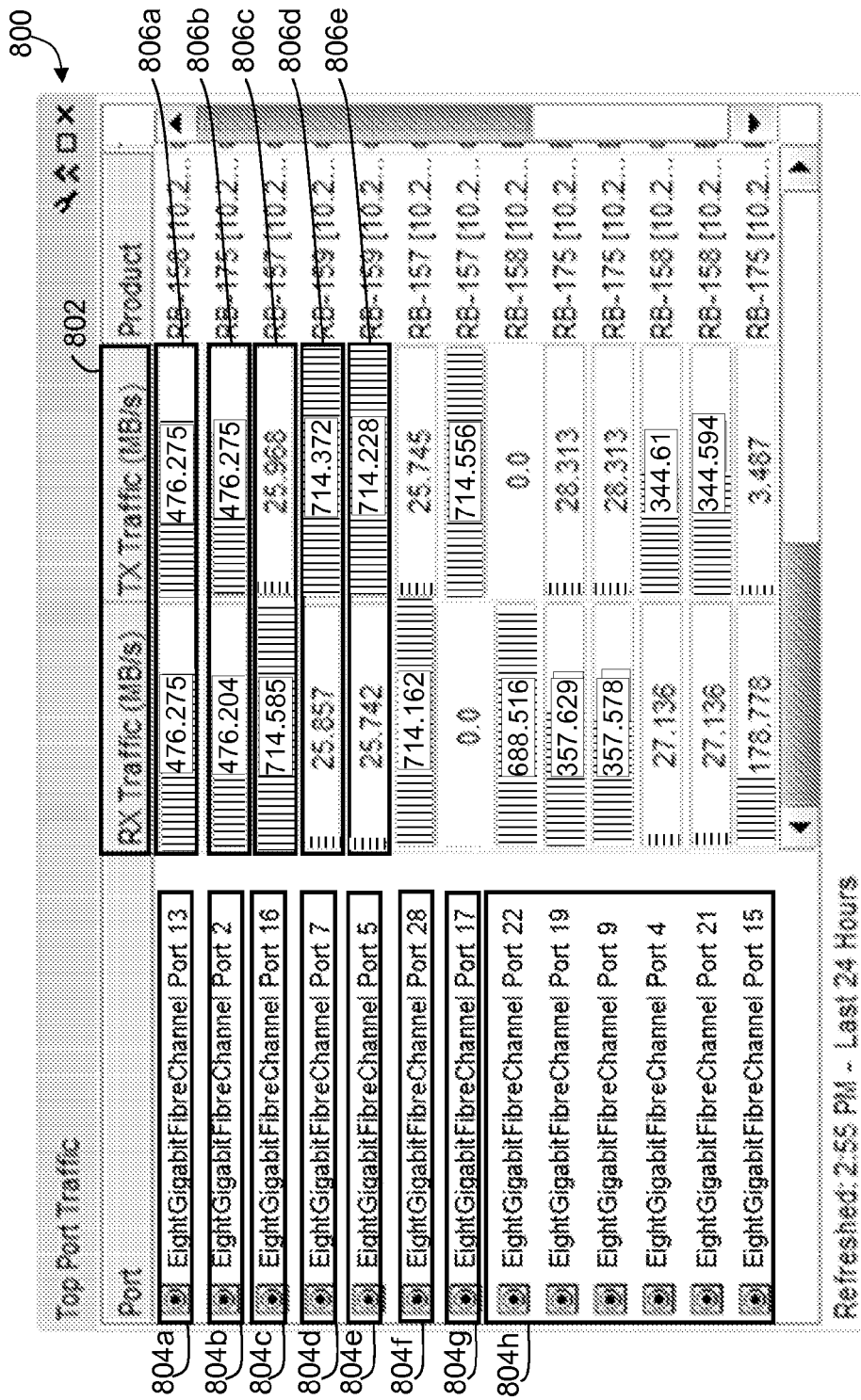
FIG. 8 is a screenshot of an example GUI according to prior art where a list of data ports is sorted in descending order based on the port with the highest total of the data transmit and receive values.

FIG. 8 illustrates an example of the GUI 800 of management software 526 wherein a plurality of ports 804 are sorted in accordance with one version of the prior art. As shown, the plurality of ports 804 are sorted in descending order based on the port having the highest total data receive and data transmit value 802 of the plurality of ports 804. Consequently, the first port 804a in the arrangement has the highest total data receive and transfer value 806a, the second port 804b in the arrangement has the second highest total data receive and transfer value 806b, the third port 804c in the arrangement has the third highest total data receive and transfer value 806c, the fourth port 804d has the fourth highest total data receive and transfer value 806d, and the fifth port 804e has the fifth highest total data receive and transfer value 806e. The remaining ports 804f, 804g, 804h are sorted in the same manner as ports 804a through 804e. The problem with this arrangement is that it may display ports with a very low data transmit value and a very high data receive value, or vice versa, towards the bottom of the arrangement. For example, ports 804c and 804f have very high receive rates and ports 804d, 804e, and 804g have very high transmit rates, yet none are at the top of the display.

Figure 9:
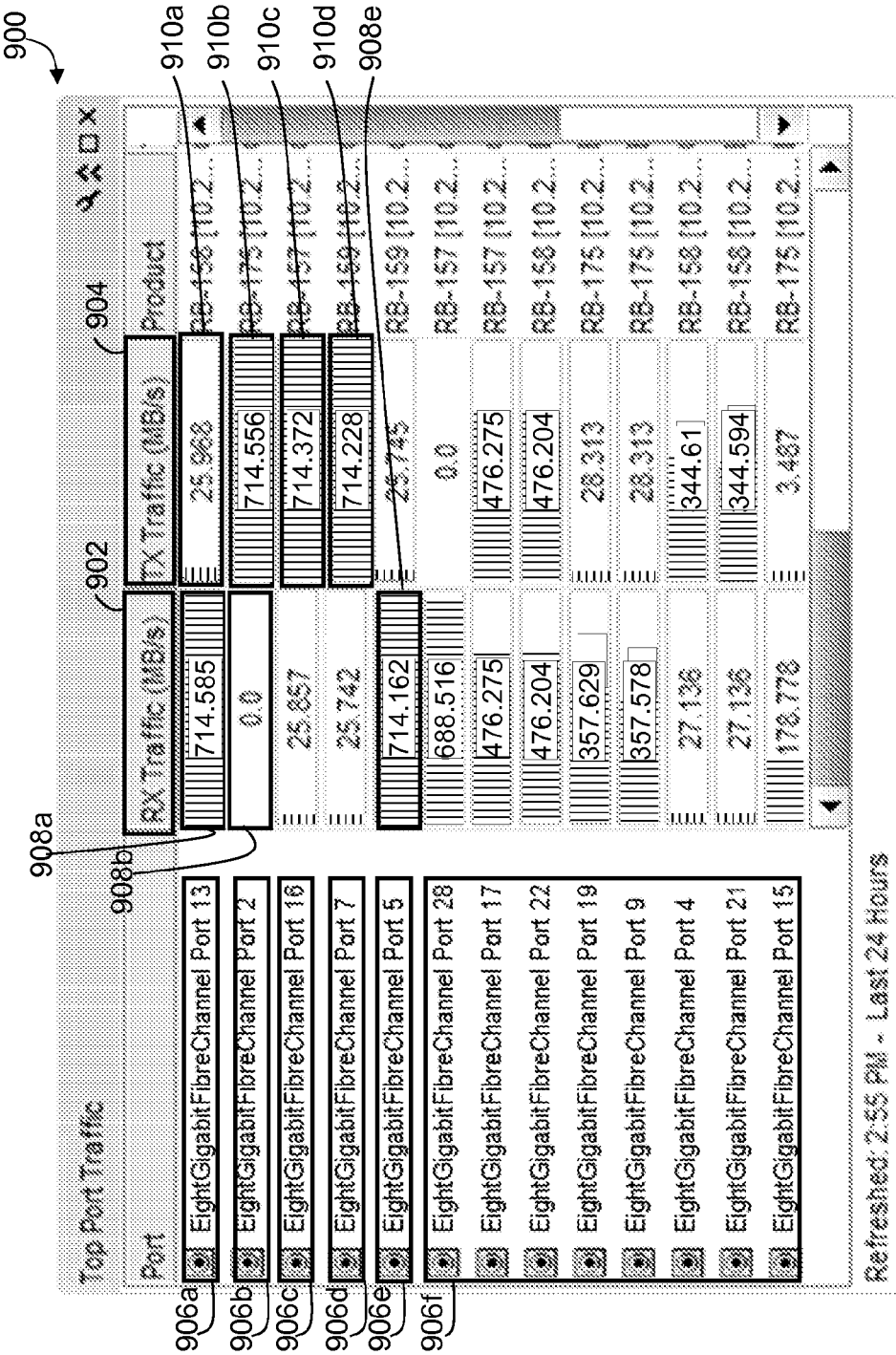
FIG. 9 is a screenshot of an example GUI according to the preferred embodiment of the present invention.

FIG. 9 illustrates an example of the GUI 900 of management software 526, wherein a plurality of ports 906 are sorted in accordance with the preferred embodiment of this invention. As shown, the plurality of ports 906 are sorted in descending order based on the higher of the data receive value 902 or data transmit value 904 for the particular port 906. Consequently, the first port 906a in the arrangement has a data receive value 908a that is the highest of the data receive values 902 and its receive rate 908a is higher than the transmit rate 908b of port 906b, the next port on the list. The transmit rate 910a of port 906a is displayed but not used in developing the sorted order. Similarly the receive rate 908b of port 906b is displayed but not used in the sorting. Following port 906b are ports 906c and 906d, based on their transmit rates 910c and 910d. Following port 906d is port 906e, based on its receive rate 908e. The remaining ports 904f are sorted in the same manner as ports 904a through 904e. This embodiment allows a network administrator to be able to easily and efficiently monitor the ports with the most utilized data transfer value or data transmit value, which is a more relevant sorting order as overloading of a port may occur in either the receive or transmit direction, and any overloading is of concern.

While communication networks using the Ethernet and FC protocols, with switches, routers and the like, have been used as the example in the Figures, the present invention can be applied to any type of data communication network.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
creating a list of ports a plurality of ports in a data communication network, said list containing a data transmit value and data receive value corresponding to each port in said list;
sorting said list of ports in descending order based on the higher of the data transmit or data receive value of each port of said plurality of ports; and
displaying said sorted list on a display device.

2. The method of claim 1, wherein the sorted list is displayed in a graphical user interface.

3. A computer readable storage medium or media having computer-executable instructions stored therein for an application which performs the following method, the method comprising:
creating a list of ports of a plurality of ports in a data communication network, said list containing a data transmit value and data receive value corresponding to each port in said list;
sorting said list of ports in descending order based on the higher of the data transmit or data receive value of each port of said plurality of ports; and
displaying said sorted list on a display device.

4. The computer readable storage medium or media of claim 3, wherein the sorted list is displayed in a graphical user interface.

5. A computer system comprising:
a processor;
a display device coupled to said processor;
storage coupled to said processor and storing computer-executable instructions for an application which cause said processor to perform the following steps:
create a list of ports of a plurality of ports in a data communication network on said display, said list containing a data transmit value and data receive value corresponding to each port in said list;
sort said list of ports in descending order based on the higher of the data transmit or data receive value of each port of said plurality of ports; and
display said sorted list on the display device.

6. The computer system of claim 5, wherein the sorted list is displayed in a graphical user interface.

* * * * *